US011164224B2

(12) United States Patent
Scheel (10) Patent No.: US 11,164,224 B2
(45) Date of Patent: Nov. 2, 2021

(54) SMART APPLICATION RATING (71) Applicant: Aetna Inc., Hartford, CT (US)

(72) Inventor: Mark Scheel, Denver, CO (US)

(73) Assignee: Aetna Inc., Hartford, CT (US)

(*) Notice: Subject to any disclaimer, the term of this patent is extended or adjusted under 35 U.S.C. 154(b) by 227 days.

(21) Appl. No.: 15/656,504

(22) Filed: Jul. 21, 2017

(65) Prior Publication Data
US 2018/0025393 A1 Jan. 25, 2018

Related U.S. Application Data (60) Provisional application No. 62/365,487, filed on Jul. 22, 2016.

(51) Int. Cl.
*G06Q 30/00* (2012.01)
*G06Q 30/02* (2012.01)
*H04L 29/08* (2006.01)
*H04W 4/029* (2018.01)
*H04W 88/02* (2009.01)

(52) U.S. Cl.
CPC ..... *G06Q 30/0282* (2013.01); *G06Q 30/0201* (2013.01); *H04L 67/22* (2013.01); *H04W 4/029* (2018.02); *H04W 88/02* (2013.01)

(58) Field of Classification Search
None
See application file for complete search history.

(56) References Cited

U.S. PATENT DOCUMENTS 8,503,340 B1 * 8/2013 Xu .................. H04W 84/12
370/310
8,559,977 B2 * 10/2013 Busch .............. H04W 4/023
455/456.1

(Continued)

FOREIGN PATENT DOCUMENTS

EP      2267991 A1 * 12/2010  .......... H04M 3/5232
GB      2539364 A  * 12/2016  .......... G01S 5/0036
WO   WO-2005032176 A1 * 4/2005  .......... H04W 4/90

OTHER PUBLICATIONS

• IBM. TCP/IP Tutorial and Technical Overview. (Dec. 21, 2006). Retrieved online Feb. 6, 2021. https://www.redbooks.ibm.com/pubs/pdfs/redbooks/gg243376.pdf (Year: 2006).*

(Continued)

*Primary Examiner* — James A Reagan
(74) *Attorney, Agent, or Firm* — Leydig, Voit & Mayer, Ltd.

(57) ABSTRACT

Embodiments of the disclosure provide a method of providing a prompt to a user for reviewing an app. The method includes monitoring, by a mobile device, environmental factors; monitoring, b a mobile device and a server, a user's activity; determining, by the mobile device, a utility of the user using the environmental factors; determining, by the mobile device and the server, an engagement score using the user's activity; when the utility of the user is determined to be high, providing the prompt to the user; and when the utility of the user is determined to be low, determining whether the engagement score is above a score threshold, and providing the prompt to the user when the engagement score is above the score threshold.

14 Claims, 3 Drawing Sheets

(56) References Cited

U.S. PATENT DOCUMENTS

| | | | | |
|---|---|---|---|---|
| 8,566,236 | B2* | 10/2013 | Busch | H04W 4/025 |
| | | | | 705/39 |
| 9,596,565 | B2* | 3/2017 | Huang | H04W 4/02 |
| 10,241,772 | B1* | 3/2019 | Ning | G06F 8/61 |
| 2011/0295722 | A1* | 12/2011 | Reisman | G06Q 30/0201 |
| | | | | 705/27.1 |
| 2012/0215911 | A1* | 8/2012 | Raleigh | H04M 15/66 |
| | | | | 709/224 |
| 2013/0331055 | A1* | 12/2013 | McKown | H04W 4/90 |
| | | | | 455/404.1 |
| 2014/0378159 | A1* | 12/2014 | Dolbakian | H04W 4/029 |
| | | | | 455/456.1 |
| 2016/0142894 | A1* | 5/2016 | Papakonstantinou | G16H 50/30 |
| | | | | 455/404.1 |
| 2016/0224803 | A1* | 8/2016 | Frank | G06F 21/6245 |
| 2017/0262603 | A1* | 9/2017 | Grow | G06F 19/3418 |
| 2017/0357721 | A1* | 12/2017 | Chernenkov | G06F 16/951 |

OTHER PUBLICATIONS

• Joseph B. Evans. Cell Phone Forensics: Powerful Tools Wielded By Federal Investigators. (Jun. 2, 2016). Retrieved online Jun. 19, 2021. https://news.law.fordham.edu/jcfl/2016/06/02/cell-phone-forensics-powerful-tools-wielded-by-federal-investigators/ (Year: 2016).*

* cited by examiner

SMART APPLICATION RATING

CROSS-REFERENCE TO RELATED APPLICATIONS

This patent application claims the benefit of U.S. Provisional Patent Application No. 62/365,487, filed Jul. 22, 2016, which is incorporated by reference.

BACKGROUND

Mobile applications (or apps) have become commonplace to provide enhanced functionality for a mobile device. These apps may be native to the mobile platform or from an independent source. For instance, certain mobile device manufacturers create mobile devices with native apps that come with their mobile operating system. These native apps cannot be removed since they are intertwined with proper functionality of the operating system. A mobile user may find the mobile device lacking and seek to enhance functionality by installing new apps from an online app store. These new apps add more functions to the mobile device, possibly increasing user satisfaction in the device. In some instances, some new apps may be agreeable to the user while others may be frustrating to the user. In both cases, the mobile user is able to provide feedback to the app store regarding his or her experience with a new app.

SUMMARY

Embodiments of the disclosure provide a method of providing a prompt to a user for reviewing an app. The method includes monitoring, by a mobile device, environmental factors; monitoring, by a mobile device and a server, a user's activity; determining, by the mobile device, a utility of the user using the environmental factors; determining, by the mobile device and the server, an engagement score using the user's activity; when the utility of the user is determined to be high, providing the prompt to the user; and when the utility of the user is determined to be low, determining whether the engagement score is above a score threshold, and providing the prompt to the user when the engagement score is above the score threshold.

Additional embodiments of the disclosure provide a method of providing a prompt to a user for reviewing an app. The method includes: monitoring, by a mobile device, environmental factors of the mobile device; monitoring, by the mobile device, a user's activity with the app; determining, by the mobile device, a utility of the user based on the environmental factors; collecting, by the mobile device, a plurality of interactions between the user and the app and utilizing the plurality of interactions in determining an engagement score; and determining whether to prompt the user for a rating of the app based on the engagement score exceeding a predetermined threshold set so to indicate a high engagement by the user with the app.

Yet further embodiments of the disclosure provide a system for providing a prompt to a user for reviewing an app. The system includes a mobile device configured for: monitoring environmental factors of the mobile device; monitoring a user's activity with the app; determining a utility of the user based on the environmental factors; collecting a plurality of interactions between the user and the app; and transmitting the plurality of interactions to a server to utilize the plurality of interactions in determining an engagement score, wherein the server assigns an engagement score based on the plurality of interactions and compares the engagement score to a predetermined threshold set so to indicate a high engagement by the user of the app.

Further embodiments of the disclosure provide a non-transitory computer readable storage device for providing a prompt to a user for reviewing an app. The non-transitory computer readable storage device having computer executable instructions for performing the steps of: monitoring environmental factors of a mobile device; monitoring a user's activity with the app residing on the mobile device; determining a utility of the user based on the environmental factors of the mobile device; collecting a plurality of interactions between the user and the app and utilizing the plurality of interactions in determining an engagement score; and determining whether to prompt the user for a rating of the app based on the engagement score exceeding a predetermined threshold set so to indicate a high engagement by the user with the app.

DETAILED DESCRIPTION

Apps in an online app store have a rating system that allows users to verbally describe and/or graphically rate their experience with an app. Verbal descriptions serve as: (1) feedback to potential customers that may decide to download and install the app; (2) feedback to current customers to verify whether other customers share a similar experience as they do; (3) feedback to app developers and app companies on what features customers like and/or do not like; and (4) potential datasets for semantic analysis by an online app store to extract most agreed upon description of an app for enhancing app search within the online app store. Graphical ratings, for example, scoring an app in the range of 1 star to 5 stars, serves to: (1) provide a quick indication of the perceived quality of an app to potential customers, customers, app developers, and app companies; and (2) provide quantitative inputs that an online app store may utilize in various algorithms to provide app rankings, app suggestions to consumers, and app statistics for possible financial negotiations with app developers and app companies.

The app store rating system carries much weight in an online app store, affecting whether an app store suggests an app to a customer. This may in time affect the popularity of an app and indirectly, the revenue that an app company makes from the app. Unfortunately, the rating system is a flawed system with a widespread influence because the ratings come directly from app customers who may have or may not have the app installed on their mobile device. For example, in the Android app store, once an app is associated with a customer's account, the customer may provide a rating for the app even if the customer canceled the app install, the app did not install properly, or the customer uninstalled the app. Customers who do not use or have not used the app may provide ratings that directly affect the performance of the app in the online store ranking and suggestion system, and customers who have the app installed may not feel like providing a rating to the app at all. To combat a potential skew in the ratings, app companies and developers have developed a system that prompts a customer while using the app to provide a rating of the app to the online store.

Even with this proactive prompting, the mood of the customer may directly influence a ratings score that the customer gives to an app. For example, if the customer is using an app, and the customer's battery is low, the customer may incorrectly attribute the battery problem to the app and have an unfavorable view of the app. As such, a factor not directly related to the app may cause a customer to view the app unfavorably. Therefore, embodiments of the disclosure provide a method of determining a favorable time to prompt a user to rate an app so that the prompt itself may not be viewed as an annoyance/inconvenience.

Embodiments of the disclosure further provide a method improving overall app rating by targeting a subset of users who have been algorithmically selected to be ideal candidates for rating prompts. An online app store may rank apps, for example, by a ratings average in a default search, such that, apps with better ranking get discovered and downloaded more often. Therefore, methods of improving an app's ratings and in turn its ranking provides an app developer or an app company a competitive advantage. Hence, by prompting users who are available to and likely to leave positive and substantive reviews, the app may be ranked higher than it would have been. Embodiments of the disclosure can collect both data on a user and use data in order to make determinations on when certain types of users are more likely to give positive or favorable ratings.

Figure 1:
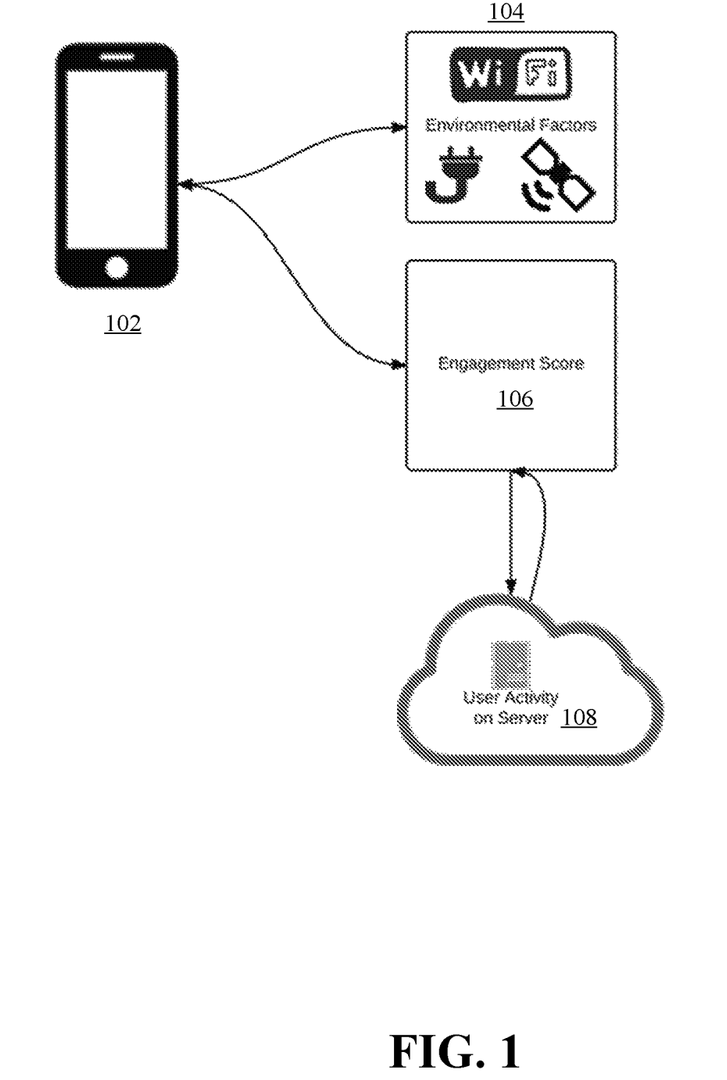
FIG. 1 is a block diagram illustrating a mobile device with various functional blocks representing activities connected to the mobile device in accordance with some example embodiments of the disclosure.

FIG. 1 is a block diagram illustrating a mobile device 102 with various functional blocks (items 104, 106, and 108) representing activities connected to the mobile device in accordance with some example embodiments of the disclosure. Mobile device 102 monitors various factors with an environmental factors engine 104 and determines an engagement score with an engagement score engine 106. Engagement score engine 106 utilizes logged user activity on server 108 to determine the engagement score. Using both the environmental factors engine 104 and engagement score engine 106, the mobile device 102 takes into account application behavior and environmental variables in order to decide when to prompt a user to rate an app running on the mobile device 102.

Mobile device 102 may be a cellular device, a laptop computer, a tablet computer, or any other device that may install apps and has access to an online app store. Mobile device 102 may contain a processor, memory, display, and user interfaces such as input interfaces like buttons, touch screens, and cameras. Mobile device 102 may further contain one or more network interfaces to support one or more networks, for example, Bluetooth®, Wi-Fi, mobile networks, etc. Mobile networks include, for example, GSM (Global System for Mobile Communications), CDMA (Code division multiple access), LTE (Long Term Evolution), etc. Mobile device 102 includes components that allow it to consider environmental factors and user behavior to determine when to prompt a user to rate an app in an external app store such that the user is sufficiently available and engaged to likely leave a review and leave a positive one at that.

Environmental factors engine 104 on mobile device 102 can monitor and collect data related to mobile device 102 and using this data, make inferences on user mood and utility. Utility is defined here as a measure of the user's happiness or contentment level which includes a combination of user availability, user's perceived moods, and resources available on mobile device 102. In some instances, environmental factors engine 104 may collect data on the Wi-Fi connectivity of mobile device 102. Environmental factors engine 104 may determine which Wi-Fi network the mobile device 102 is connected to, and based on the time of the day, determine whether the user is at home or at work. Depending on the user, this information can be used to find a time when the user is likely to want to provide a better rating for the app. For example, the user may be more relaxed at home and thus more likely to give a good rating. Additionally, the environmental factors engine 104 may have a capacity to measure and adapt over time. For example, with the assumption that the user is more relaxed at home and thus more likely to provide a good rating, the environmental factors engine 104 may take a few data points and determine whether the assumption on the time to collect the reviews is resulting in positive or negative reviews. And if mostly negative reviews are linked to this assumption, the environmental factors engine 104 adapts by choosing a different time to prompt.

In some instances, the environmental factors engine 104 may monitor the power level of mobile device 102. It may determine whether the mobile device 102 is plugged in or not and also the battery strength of mobile device 102. If power is an issue, a prompt for review may not be provided because the user may not have enough battery life left to properly complete a review. In a similar situation, environmental factors engine 104 may monitor the location of the mobile device 102 with Global Positioning System (GPS). If mobile phone 102 is moving fast, the environmental factors engine 104 may determine that the user is probably driving and so a prompt to review is not appropriate. The user in this case has a low utility due to environmental factors engine 104 determining that the user is unavailable for review. In some embodiments, if the mobile device 102 is stationary, this information may be combined with the current time, as such determining that the user is at work and that it is favorable to provide a prompt for review.

Environmental factors engine 104 also takes various measures of time into account. For example, determination of whether the user is at home or at work may be due to change in Wi-Fi networks from Network A1 during the day to Network B1 at night, and A1 may be predicted to be the user's work network and B1 the user's home network. This determination may also be made based on network speed, for example if the speed of A1 is faster than the speed of B1, then environmental factors engine 104 may determine that A1 is the user's work network since the user is likely to have a faster network at work.

Network data may be collected when the mobile device 102 is making server calls, and the communications can measure the speed of an application programming interface (API) call. If mobile device 102 is able to make a round trip API call, the duration of the API call can be measured and then tracked relative to other users' devices. If the duration is quicker, then this can be used to determine if the user is operating over a faster network than others. Environmental factors engine 104 may then prompt for a user to review—assuming the psychology that the user will be happier on a faster network. In addition to speed of network data transfers, signal strength of the mobile device 102 can be used similarly—a user is less likely to be happy when they have a bad connection and may not give a good rating. The signal strength can be measured and/or inferred based on location, such as a hospital basement where there is bad signal strength. Environmental factors engine 104 can use network data to infer user's moods which inform on user's utility. In certain embodiments, the utility is compared to a predetermined environmental factors threshold so to determine whether the utility is appropriate for requesting a review by the user.

Engagement score engine 106, ran by the mobile device 102, is tasked with facilitating the calculation of an activity score also called an engagement score based on user activity. Certain actions represent higher engagement actions, for example, a user adding a feature to his or her account. The active interaction of adding a feature is higher than a user parking on or just looking at a login screen. Each determined interactive action or inferred non-interactive action is given score. Each time a user engages an app or uses an app, the user can be given a score and the scores are additive such that when the user gets to a targeted score threshold, then the user is deemed to like or at least use the application often. A user that reaches or exceeds this threshold may be categorized as a user who will give well-informed feedback that is most likely positive considering the frequency of use and level of engagement with the app.

Engagement score engine 106 further assigns scores to each activity and the number of times those activities are undertaken. Each successive activity of the same type may be discounted, provided the same weight, or provided a more important weight than the previous activity of the same type. To reduce storage requirements on mobile device 102, the scores and activities may be stored on a remote server represented as User Activity on Server 108. The activity scores reside on the remote server, relying on engagement score engine 106, to provide user activity data in order to keep track of these activity scores. However, in other embodiments, the functionality of server 108 may be entirely performed locally by the mobile device 102.

The remote server is responsible for determining the engagement score since it stores all the cumulative scores of all activities undergone in an app running on mobile device 102. For instance, the remote server would interface with engagement score engine 106 to track what the user searches and other activities. These actions are scored and recorded at the server. Occasionally, the app residing on the mobile device will contact the engagement score engine 106 for the engagement score engine 106 to request from the remote server the engagement score in order to determine whether to prompt the user to provide a rating.

The environmental factors are present to determine the threshold score on when to prompt. If the environmental factors indicate that the user is happy and likely to give a good rating (user has a high utility), then the mobile device 102 can prompt for rating based on lower total engagement score. However, if the environmental factors indicate the user is not happy or not in the ideal situation (has a low utility), then the score threshold must be higher before prompting for a review. As such, an environmental threshold may be defined as well to check against user utility, designating whether environmental conditions are met. For instance, if a user is deemed to be driving, then the environmental threshold has not been met, and the engagement score is checked against the score threshold. Overall, the score threshold and the environmental threshold can play off each other to determine when to prompt a user to rate an app.

In the healthcare app context, a non-exclusive list of engagement factors contributing the engagement score and an assigned score for performing that function in parenthesis is: user opening app (1); user views home screen of app (2); user searches for a symptom or condition (4); user searching for a facility or doctor (5); user views a facility of doctor (6); user logs into an account (10); user uses map functionality with current location from app (12); user calls a facility or doctor from app (14); user books an appointment with doctor (18); user creates an account with app (22); and user saves an item to their account, such as a symptom, condition, facility or doctor (25). An exemplary threshold for the score is 50, such that as any of the aforementioned activities are performed by the user device operated by the user, the associated score (in parenthesis) is added to the engagement score by the server 108. Once that score reaches the example threshold of 50, the environmental factors are reviewed by the environmental factors engine 104, and if the environmental factors show a favorable environment, then the app will request a rating from the user.

Figure 2:
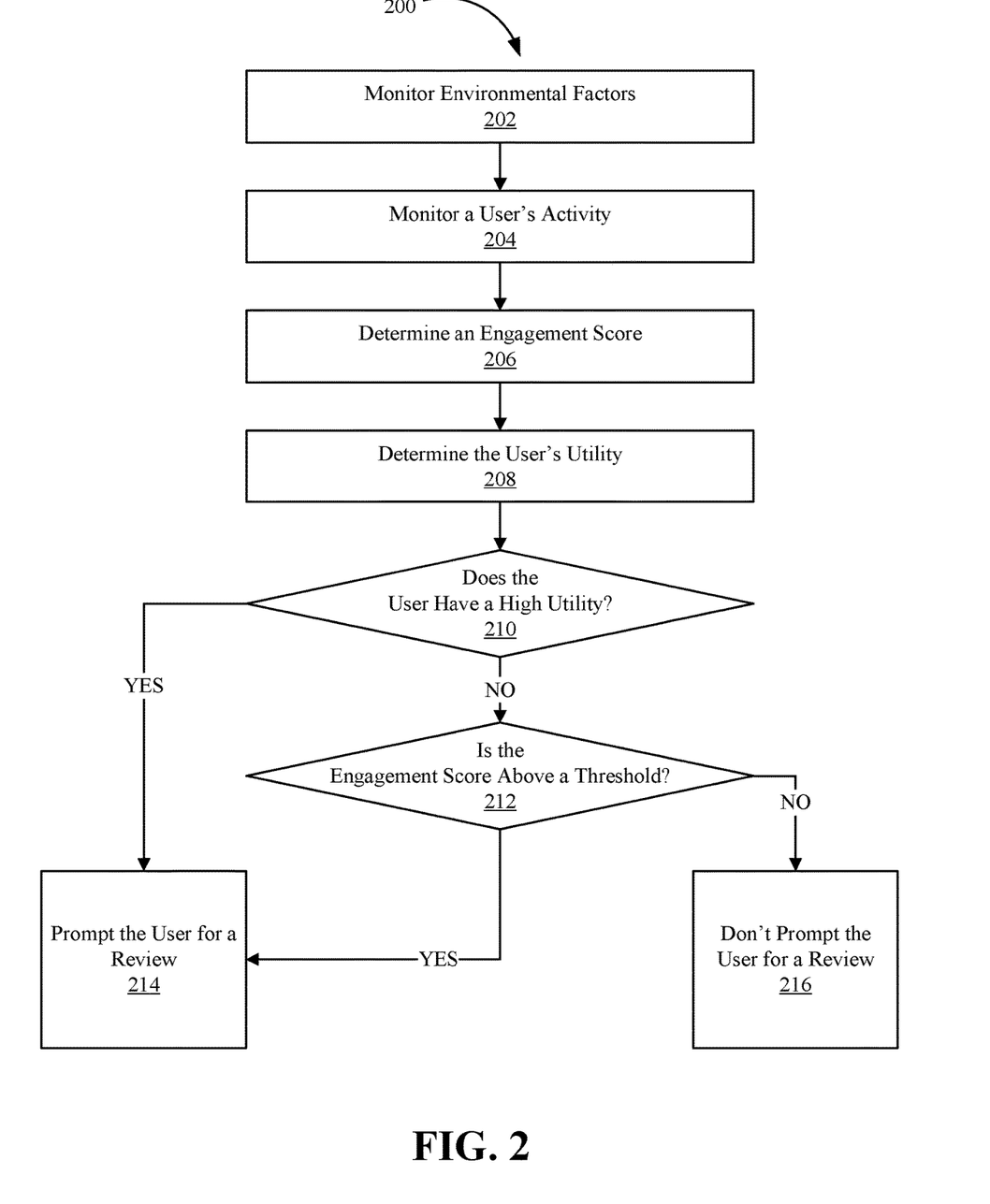
FIG. 2 is a flow diagram illustrating steps involved before a mobile device prompts a user to provide an app review according to some embodiments of the disclosure.

FIG. 2 is a flow diagram illustrating steps involved before a mobile device prompts a user to provide an app review according to some embodiments of the disclosure. FIG. 2 is an example based on the system and embodiments provided for FIG. 1. At step 202, the mobile device 102 monitors environmental factors. The mobile device relies on environmental factors engine 104 to collect data on, for example, network speed, Wi-Fi, GPS, battery, etc., and make inferences on user utility and availability.

At step 204, the mobile device uses engagement score engine 106 in communication with a remote server to monitor a user's activity in an app. The engagement score engine 106 provides scores for various user activities and stores these scores and activities on the remote server.

At steps 206 and 208, the mobile device 102 determines an engagement score and the user's utility. Engagement score is determined by engagement score engine 106 requesting that the remote server calculate the engagement score and sending the engagement score to the mobile device 102. The user's utility is determined using the information determined by environmental factors engine 104. For example, when a user is on a slow network connection, then the user is determined to have low utility.

At step 210, the mobile device determines whether the user has a high utility. This step involves a comparison to see whether an environmental threshold is reached. For example, when a user is on a slow network connection, the user is determined to have not reached the environmental threshold. On the other hand, when the user has great battery life, the user may be determined to have reached the environmental threshold. These examples use one factor, but a combination of factors may be used to determine whether the user's utility reaches or exceeds the environmental threshold. For example, the network speed may be combined with the battery life to determine whether or not the environmental threshold is reached. If the environmental threshold is reached, at step 214, the app running on the mobile device 102 prompts the user for a review.

If the environmental threshold is not reached, then at step 212, the mobile device 102 determines whether the engagement score is above a score threshold. The score threshold may be obtained from the remote server at the same time the engagement score is obtained. In some embodiments, the remote server only provides to the mobile device 102 a flag signaling an affirmative that the engagement score is above the score threshold, so the mobile device 102 checks whether the flag exits. If the score is at or above the score threshold, then at step 214, the user is prompted for a review, but if the score is less than the score threshold, then at step 216, the user is not prompted for a review.

Figure 3:
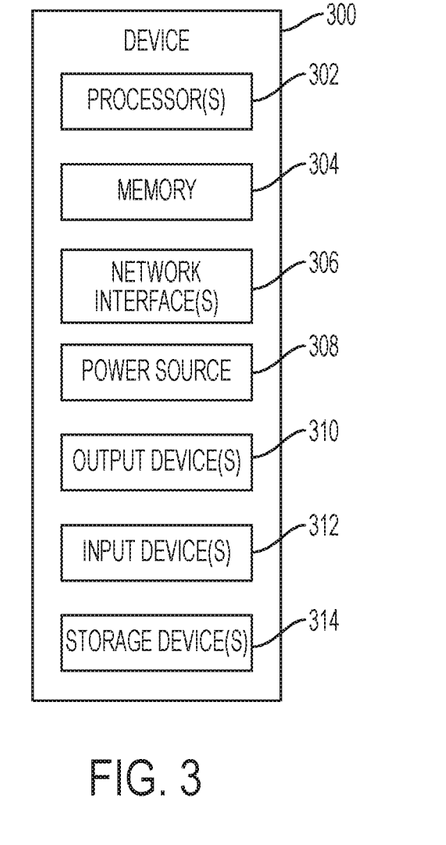
FIG. 3 provides an exemplary electronic device according to an embodiment of the disclosure.

FIG. 3 illustrates an electronic device 300 according to an embodiment of the disclosure. Electronic devices, for example, servers and user devices comprising the mobile device 102, running the environmental factors engine 104 and the engagement score engine 106, and the server 108, in certain embodiments, may be computer devices as shown in FIG. 3. The device 300 may include one or more processors 302, memory 304, network interfaces 306, power source 308, output devices 310, input devices 312, and storage devices 314. Although not explicitly shown in FIG. 3, each component provided is interconnected physically, communicatively, and/or operatively for inter-component communications in order to realize functionality ascribed to the various entities identified in FIG. 1 and referenced in FIG. 2. To simplify the discussion, the singular form will be used for all components identified in FIG. 3 when appropriate, but the use of the singular does not limit the discussion to only one of each component. For example, multiple processors may implement functionality attributed to processor 302.

Processor 302 is configured to implement functions and/or process instructions for execution within device 300. For example, processor 302 executes instructions stored in memory 304 or instructions stored on a storage device 314. In certain embodiments, instructions stored on storage device 314 are transferred to memory 304 for execution at processor 302. Memory 304, which may be a non-transient, computer-readable storage medium, is configured to store information within device 300 during operation. In some embodiments, memory 304 includes a temporary memory that does not retain information stored when the device 300 is turned off. Examples of such temporary memory include volatile memories such as random access memories (RAM), dynamic random access memories (DRAM), and static random access memories (SRAM). Memory 304 also maintains program instructions for execution by the processor 302 and serves as a conduit for other storage devices (internal or external) coupled to device 300 to gain access to processor 302.

Storage device 314 includes one or more non-transient computer-readable storage media. Storage device 314 is provided to store larger amounts of information than memory 304, and in some instances, configured for long-term storage of information. In some embodiments, the storage device 314 includes non-volatile storage elements. Non-limiting examples of non-volatile storage elements include floppy discs, flash memories, magnetic hard discs, optical discs, solid state drives, or forms of electrically programmable memories (EPROM) or electrically erasable and programmable (EEPROM) memories.

Network interfaces 306 are used to communicate with external devices and/or servers. The device 300 may comprise multiple network interfaces 306 to facilitate communication via multiple types of networks. Network interfaces 306 may comprise network interface cards, such as Ethernet cards, optical transceivers, radio frequency transceivers, or any other type of device that can send and receive information. Non-limiting examples of network interfaces 1206 include radios compatible with several Wi-Fi standards, 3G, 4G, Long-Term Evolution (LTE), Bluetooth®, etc.

Power source 308 provides power to device 300. For example, device 300 may be battery powered through rechargeable or non-rechargeable batteries utilizing nickel-cadmium or other suitable material. Power source 308 may include a regulator for regulating power from the power grid in the case of a device plugged into a wall outlet, and in some devices, power source 308 may utilize energy scavenging of ubiquitous radio frequency (RF) signals to provide power to device 300.

Device 300 may also be equipped with one or more output devices 310. Output device 310 is configured to provide output to a user using tactile, audio, and/or video information. Examples of output device 310 may include a display (cathode ray tube (CRT) display, liquid crystal display (LCD) display, LCD/light emitting diode (LED) display, organic LED display, etc.), a sound card, a video graphics adapter card, speakers, magnetic, or any other type of device that may generate an output intelligible to a user.

Device 300 is equipped with one or more input devices 312. Input devices 312 are configured to receive input from a user or the environment where device 300 resides. In certain instances, input devices 312 include devices that provide interaction with the environment through tactile, audio, and/or video feedback. These may include a presence-sensitive screen or a touch-sensitive screen, a mouse, a keyboard, a video camera, microphone, a voice responsive system, or any other type of input device.

The hardware components described thus far for device 300 are functionally and communicatively coupled to achieve certain behaviors. In some embodiments, these behaviors are controlled by software running on an operating system of device 300.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method of providing a prompt to a user of a mobile device for reviewing an app running on the mobile device, the method comprising:
   monitoring, by the mobile device, environmental factors of the mobile device;
   collecting, by the mobile device, a user's activity with the app, the user's activity including a plurality of interactions between the user and the app, and utilizing the plurality of interactions in determining an engagement score;
   monitoring, by the mobile device, the user's activity with the app;
   determining, by the mobile device, a utility of the user based on the environmental factors;
   determining, by the mobile device, that the engagement score exceeds a score predetermined threshold set so as to indicate a high engagement by the user with the app;
   determining, by the mobile device, a speed of a Wi-Fi network the mobile device is using and a duration of a round trip application programming interface (API) call with a server, wherein the speed of the Wi-Fi network and the duration of the round trip API call provides an indication of whether the mobile device is located at the user's place of work or at the user's home;
   based on the determining of the speed of the Wi-Fi network and the duration of the round trip API call with the server, determining, by the mobile device, that the utility of the user exceeds an environmental factors predetermined threshold set so as to indicate a high utility of the user for the app; and
   determining, by the mobile device, a time at which to prompt the user for a rating of the app based on the engagement score exceeding the score predetermined threshold and the utility exceeding the environmental factors predetermined threshold.

2. The method of claim 1, wherein each of the plurality of interactions is assigned an individual engagement score such that when that action is performed in the app the individual engagement score is added to the engagement score.

3. The method of claim 1, wherein the plurality of interactions comprises: the user opening the app, the user views a home screen of the app, the user searches for a symptom or condition on the app, the user searching for a facility or doctor on the app, the user views a facility of the doctor on the app, the user logs into an account on the app, the user uses map functionality with current location from the app, the user calls the facility or doctor from the app, the user books an appointment with the doctor from the app, the user creates an account with the app, and the user saves an item to a storage associated with the account, including the symptom, the condition, the facility or the doctor.

4. The method of claim 1, wherein:
   monitoring environmental factors of the mobile device comprises collecting one or more types of mobile device operational data, the one or more types including one or more of: network connectivity, an identity of the network, a signal strength, a location, a velocity, a speed of an API call, a plugged in status, and a battery strength; and
   determining the utility of the user comprises determining the utility of the user based on at least one of the one or more types of mobile device operational data.

5. The method according to claim 4, wherein determining the utility of the user further comprises determining the utility of the user further based on a plurality of the one or more types of mobile device operational data.

6. The method of claim 1, wherein:
   the utility of the user is defined as a measure of one or more of: a mood of the user, an availability of the user, and an availability of resources of the mobile device; and
   determining the utility of the user comprises inferring the user utility based on the environmental factors.

7. The method of claim 1, wherein monitoring the user's activity with the app comprises scoring various user activities with the app.

8. The method of claim 1, further comprising prompting, by the mobile device, the user for the rating of the app at the time determined by the mobile device.

9. A system for providing a prompt to a user of a mobile device for reviewing an app running on the mobile device, the system comprising:
   a mobile device comprising one or more processors, wherein the one or more processors are configured for:
   monitoring environmental factors of the mobile device;
   collecting a user's activity with the app, the user's activity including a plurality of interactions between the user and the app, and utilizing the plurality of interactions in determining an engagement score;
   monitoring the user's activity with the app;
   determining a utility of the user based on the environmental factors;
   determining that the engagement score exceeds a score predetermined threshold set so as to indicate a high engagement by the user with the app;
   determining a speed of a Wi-Fi network the mobile device is using and a duration of a round trip application programming interface (API) call with a server, wherein the speed of the Wi-Fi network and the duration of the round trip API call provides an indication of whether the mobile device is located at the user's place of work or at the user's home;
   based on the determining of the speed of the Wi-Fi network and the duration of the round trip API call with the server, determining that the utility of the user exceeds an environmental factors predetermined threshold set so as to indicate a high utility of the user for the app; and
   determining a time at which to prompt the user for a rating of the app based on the engagement score exceeding the score predetermined threshold and the utility exceeding the environmental factors predetermined threshold.

10. The system of claim 9, wherein each of the plurality of interactions is assigned an individual engagement score such that when that action is performed in the app the individual engagement score is added to the engagement score.

11. The system of claim 9, wherein the plurality of interactions comprises: the user opening the app, the user views a home screen of the app, the user searches for a symptom or condition on the app, the user searching for a facility or doctor on the app, the user views a facility of the doctor on the app, the user logs into an account on the app, the user uses map functionality with current location from the app, the user calls the facility or doctor from the app, the user books an appointment with the doctor from the app, the user creates an account with the app, and the user saves an item to a storage associated with the account, including the symptom, the condition, the facility or the doctor.

12. A non-transitory computer-readable storage medium having computer-executable instructions stored thereon for providing a prompt to a user of a mobile device for reviewing an app running on the mobile device, wherein, when executed by one or more processors of the mobile device, the instructions cause the one or more processors to perform the steps of:

monitoring environmental factors of a mobile device;

collecting a user's activity with the app, the user's activity including a plurality of interactions between the user and the app, and utilizing the plurality of interactions in determining an engagement score;

monitoring the user's activity with the app;

determining a utility of the user based on the environmental factors;

determining that the engagement score exceeds a score predetermined threshold set so as to indicate a high engagement by the user with the app;

determining a speed of a Wi-Fi network the mobile device is using and a duration of a round trip application programming interface (API) call with a server, wherein the speed of the Wi-Fi network and the duration of the round trip API call provides an indication of whether the mobile device is located at the user's place of work or at the user's home;

based on the determining of the speed of the Wi-Fi network and the duration of the round trip API call with the server, determining that the utility of the user exceeds an environmental factors predetermined threshold set so as to indicate a high utility of the user for the app; and determining a time at which to prompt the user for a rating of the app based on the engagement score exceeding the score predetermined threshold and the utility exceeding the environmental factors predetermined threshold.

13. The non-transitory computer-readable storage device of claim 12, wherein each of the plurality of interactions is assigned an individual engagement score such that when that action is performed in the app the individual engagement score is added to the engagement score.

14. The non-transitory computer readable storage device of claim 12, wherein the plurality of interactions comprises: the user opening the app, the user views a home screen of the app, the user searches for a symptom or condition on the app, the user searching for a facility or doctor on the app, the user views a facility of the doctor on the app, the user logs into an account on the app, the user uses map functionality with current location from the app, the user calls the facility or doctor from the app, the user books an appointment with the doctor from the app, the user creates an account with the app, and the user saves an item to a storage associated with the account, including the symptom, the condition, the facility or the doctor.

* * * * *